(12) United States Patent  
Siegel

(10) Patent No.: US 10,638,724 B1
(45) Date of Patent: May 5, 2020

(54) PET GROOMING COMB CLEANER

(71) Applicant: Lynnette Siegel, Sherwood, OH (US)

(72) Inventor: Lynnette Siegel, Sherwood, OH (US)

( * ) Notice: Subject to any disclaimer, the term of this patent is extended or adjusted under 35 U.S.C. 154(b) by 197 days.

(21) Appl. No.: 15/951,188

(22) Filed: Apr. 12, 2018

(51) Int. Cl.
*A01K 13/00* (2006.01)
*B26B 19/38* (2006.01)

(52) U.S. Cl.
CPC ............ *A01K 13/001* (2013.01); *B26B 19/38* (2013.01)

(58) Field of Classification Search
CPC .... A01K 13/002; A01K 13/001; A46B 17/06; B26B 19/38
USPC ............ 119/611, 625, 617; 15/142; 132/119, 132/120; 30/346.56
See application file for complete search history.

(56) References Cited

U.S. PATENT DOCUMENTS

| | | | | |
|---|---|---|---|---|
| 1,183,528 A | * | 5/1916 | Bongiovanni | A47L 13/502 15/142 |
| 1,897,935 A | * | 2/1933 | Harry | A45D 24/42 132/119 |
| 2,084,603 A | * | 6/1937 | True | A45D 24/40 15/142 |
| 3,422,927 A | * | 1/1969 | Menk | B26B 19/38 184/102 |
| 3,994,040 A | * | 11/1976 | DiStefano | A63B 57/60 15/236.06 |
| 5,426,811 A | * | 6/1995 | Walton | A45D 27/46 15/105 |
| 5,603,137 A | * | 2/1997 | Hasan | A46B 7/04 119/628 |
| 6,779,220 B1 | * | 8/2004 | Raffa | A46B 17/06 132/150 |
| 6,782,846 B1 | * | 8/2004 | Porter | A01K 13/002 119/611 |
| 7,263,738 B2 | * | 9/2007 | Moore | A45D 27/46 15/105 |
| 7,739,769 B2 | * | 6/2010 | DiPippo | A46B 17/06 119/628 |
| 2014/0026822 A1 | * | 1/2014 | Harris, II | A01K 13/002 119/628 |

FOREIGN PATENT DOCUMENTS

GB 2299924 A * 10/1996 ............. A45D 24/42

* cited by examiner

*Primary Examiner* — Yvonne R Abbott-Lewis
(74) *Attorney, Agent, or Firm* — Gugliotta & Gugliotta LPA

(57) ABSTRACT

A pet grooming clipper cleaning assist device is provided having a body formed of a generally planar element having a thickness that is smaller than an overall width. Along a distal end of the body forming a flat, linear face having a lateral linear centerline forms a plurality of equally sized receiving sockets each being equally positioned and having a female thread, each for connection of a cleaning swab. A plurality of cleaning swabs, one each for engagement with each said socket. Each cleaning swab has a linear shaft having a swab head at a distal end of a shaft and a male threaded connection at a proximal end of said shaft. Each swab head further comprises a soft gripping element.

12 Claims, 6 Drawing Sheets

PET GROOMING COMB CLEANER

RELATED APPLICATIONS

There are no previously filed, nor currently any co-pending applications, anywhere in the world.

BACKGROUND OF THE INVENTION

1. Field of the Invention

The present invention relates to a pet grooming equipment and, more particularly, to a cleaning apparatus for use in conjunction with pet grooming clippers.

2. Description of the Related Art

At first glance a dog groomer's clippers appear visually to be very similar to those used by a barber for trimming human hair. However, pet grooming clippers have a number of differences and adaptations in order to accommodate the differences is use. Generally, pet grooming clippers have a different blade design to prevent pulling a pet's hair. Pet clippers also have motors and blades designed to cut a variety of fur types. These and many other modifications result such grooming devices being almost twice as expensive as their human use counterpart.

In spite of such improvements and adaptations, pet grooming devices can still be high maintenance tools. Especially when used with canines, who may have variations in coat texture and consistency from curly to wirey, short to long, a groomer's combs can still become frequently clogged or results in prolonging the activity due to the regular need to stop and untangle or unclog a clipper head comb.

Consequently, a need exists for providing an apparatus and method which aids in the maintenance of comb blades and removal of clogs and tangles.

SUMMARY OF THE INVENTION

It is thus an object of the present invention to provide an accessory for pet grooming equipment to aid in the maintenance of fur clippers.

It is a feature of the present invention to provide a cleaning apparatus for use in conjunction with pet grooming clippers.

The present invention provides a pet grooming clipper cleaning assist device having a body formed of a generally planar element having a thickness that is smaller than an overall width. Along a distal end of the body forming a flat, linear face having a lateral linear centerline forms a plurality of equally sized receiving sockets each being equally positioned and having a female thread, each for connection of a cleaning swab. A plurality of cleaning swabs, one each for engagement with each said socket. Each cleaning swab has a linear shaft having a swab head at a distal end of a shaft and a male threaded connection at a proximal end of said shaft. Each swab head further comprises a soft gripping element. An inner surface of the handle further forms a series of gripping knurls adapted to provide a convenient gripping surface that improves the gripability of the handle. The soft griping element of each cleaning swab forms a surface that can cling to, grab and pull entangled fur from the clipper and thereby increase cleaning efficiency.

When used during or between groomings the pet grooming clipper cleaner can remove impacted or tangled fur from between a clipper's blades or grooming comb attachments.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Figure 1:
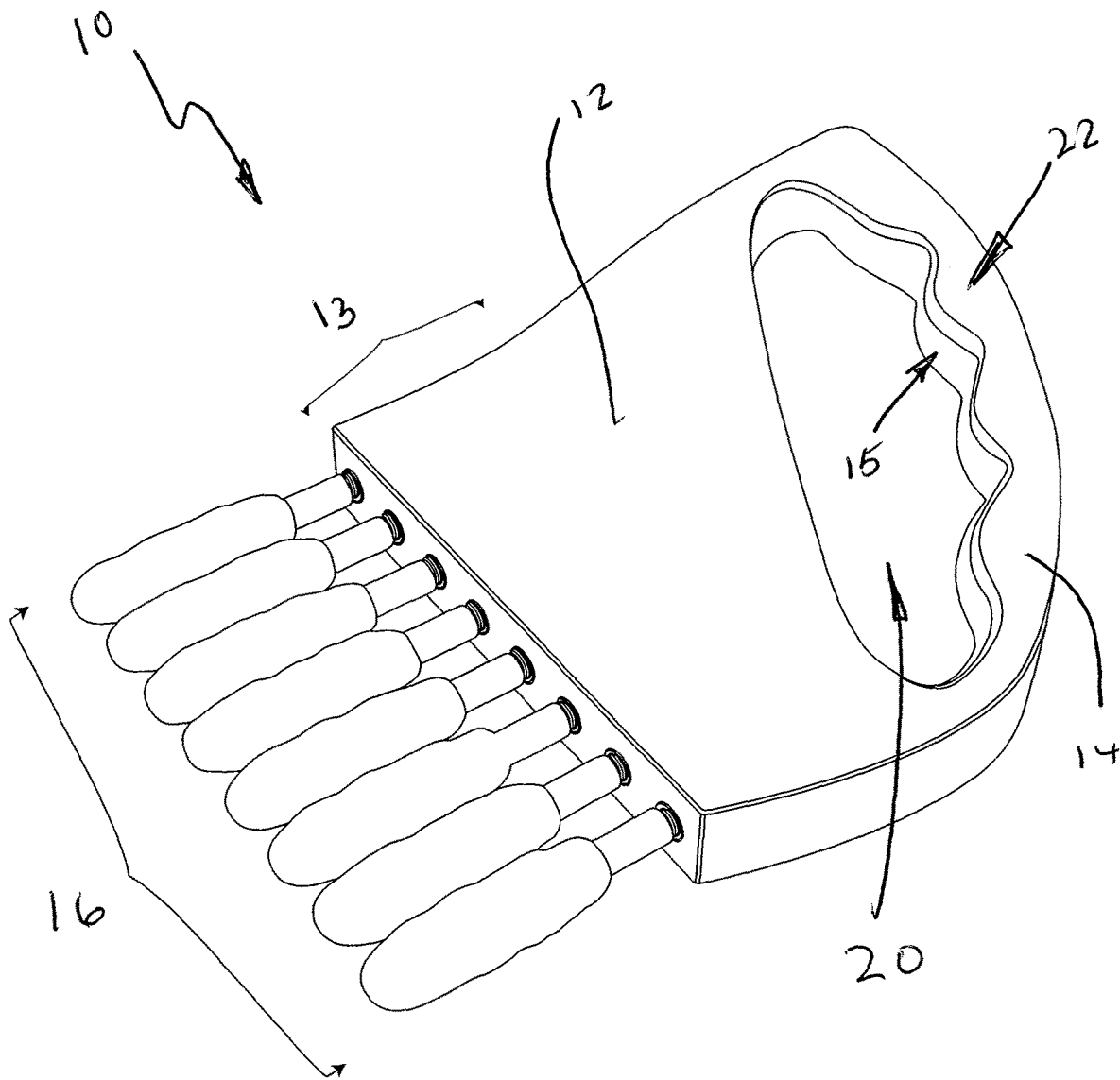
FIG. 1 is a top perspective view of a clipper cleaner device 10 shown according to the preferred embodiment of the present invention.
Figure 2:
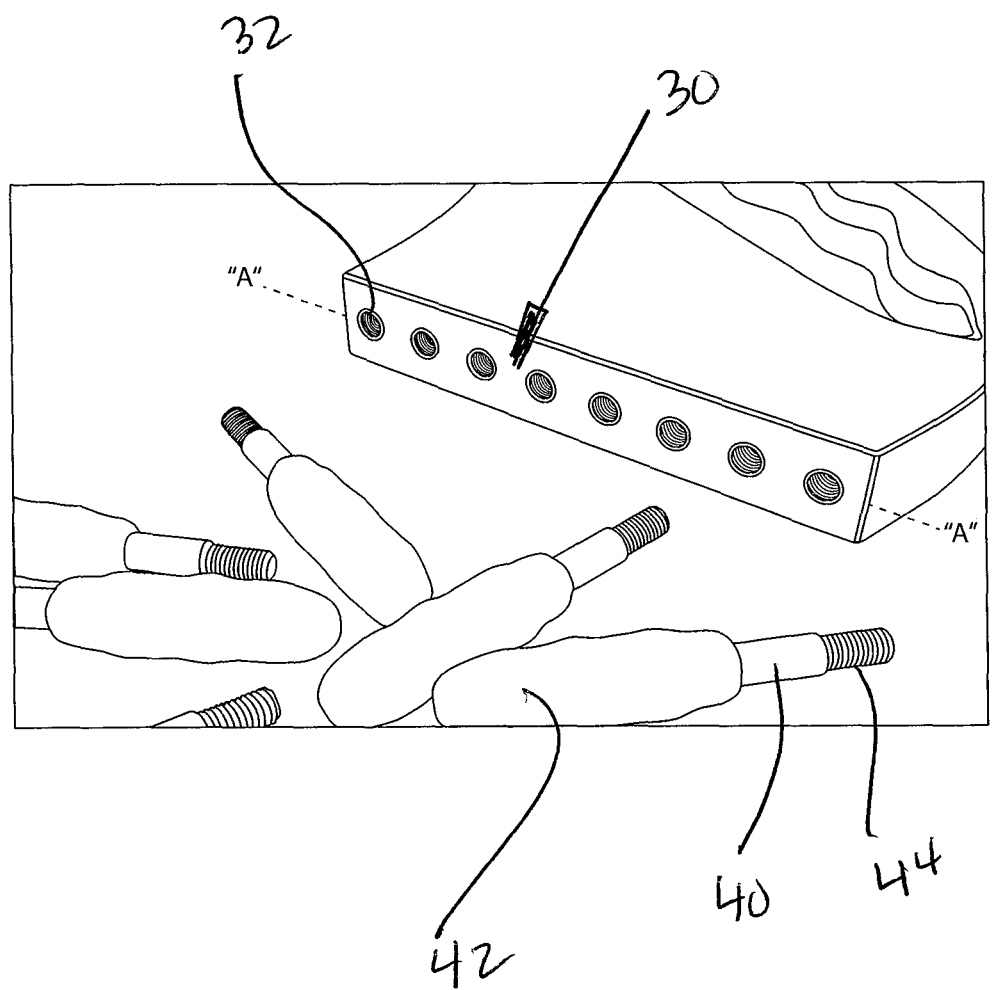
FIG. 2 is a front partial exploded perspective view of the clipper cleaner device 10 shown in a disassembled condition.
Figure 3:
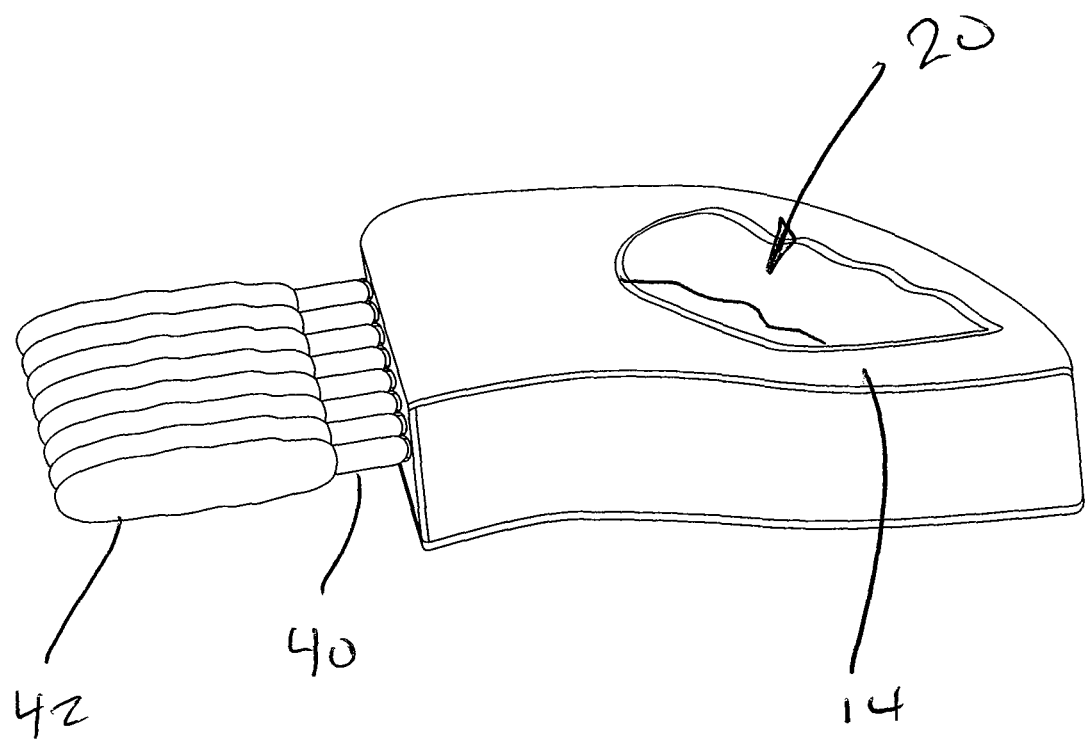
FIG. 3 is a left side perspective view thereof.
Figure 4:
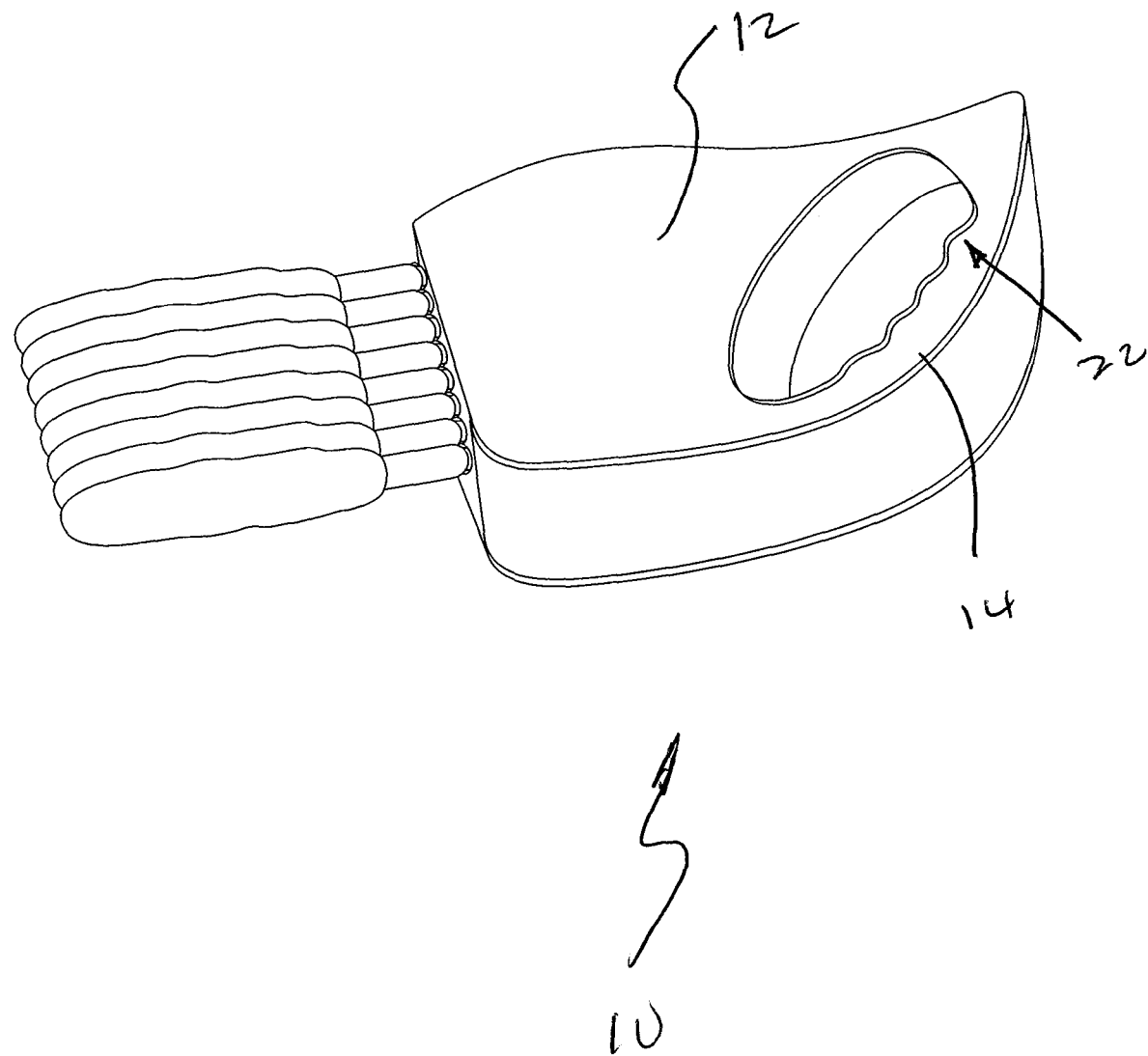
FIG. 4 is a right side perspective view thereof.
Figure 5:
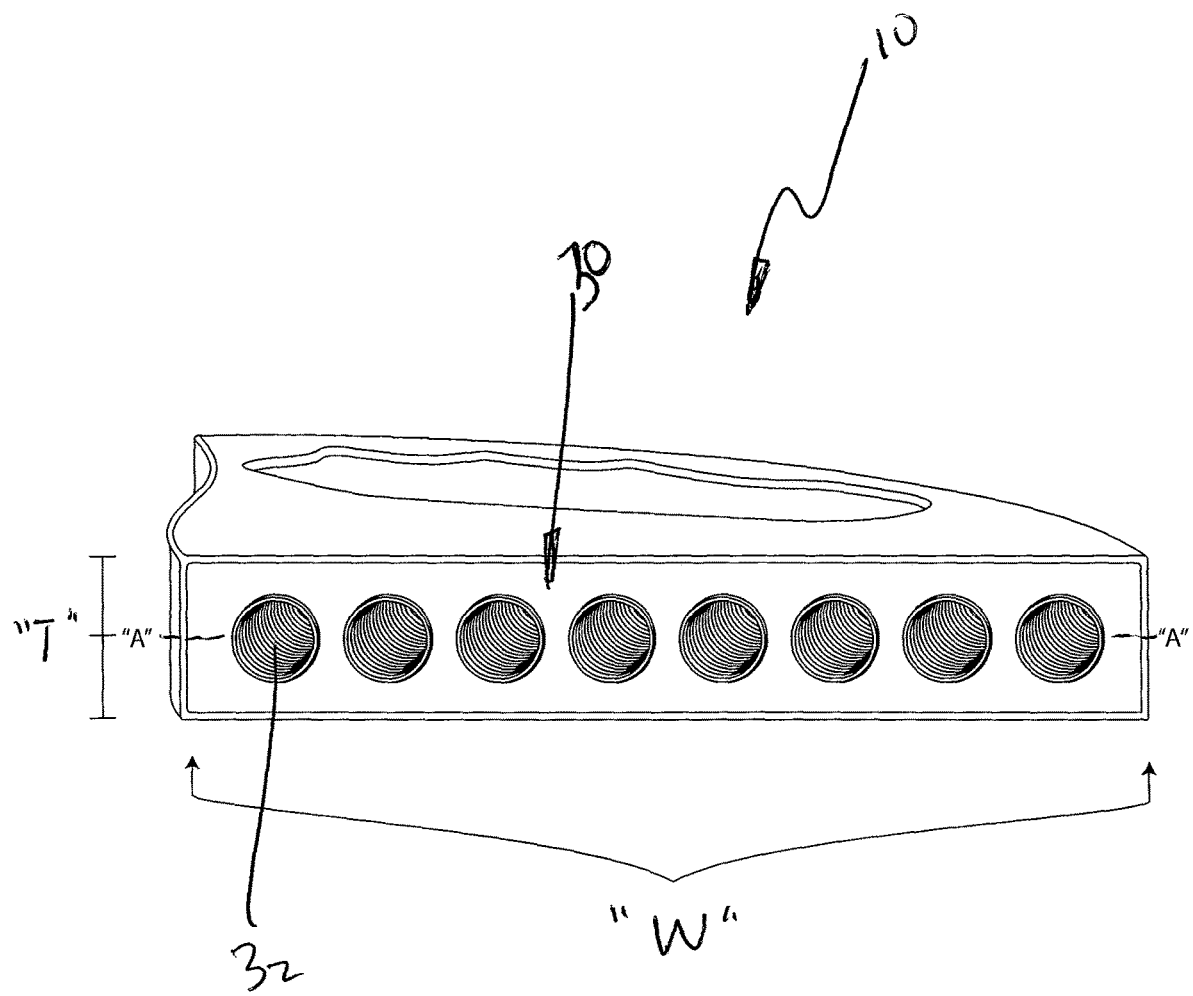
FIG. 5 is a front perspective view thereof shown having the cleaning wicks removed.
Figure 6:
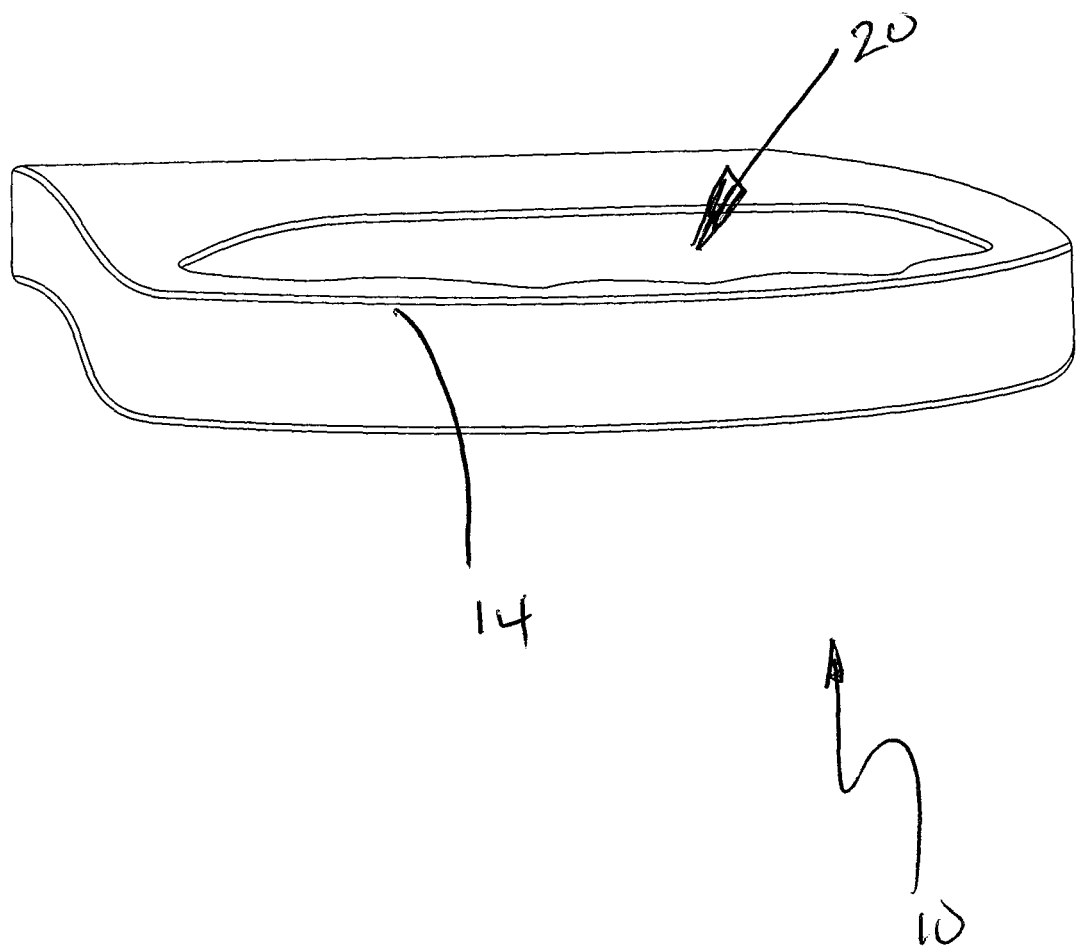
FIG. 6 is a rear perspective view thereof.

Referring now to FIG. 1 through FIG. 6, wherein like reference numerals indicate the same parts throughout the several views, a clipper cleaner, generally noted as 10, is shown according to a preferred embodiment of the present invention. The clipper cleaner 10 is formed essentially of a body 12 forming a handle 14, and a plurality of cleaning swabs 16.

The body 12 is formed of a generally planar element having an overall thickness "T" that is appreciably smaller than an overall width "W". According to a preferred aspect of the present invention, the dimension "W" is greater than four times the dimension "T". According to another preferred aspect of the present invention, the dimension "W" is greater than six times the dimension "T". The generally flat, planar body 12 further forms a grasping orifice 20 between a main portion of the body 12 and the handle 14.

According to yet another aspect of the present invention the inner surface 15 of the handle 14 further forms a series of gripping knurls 22 adapted to provide a convenient gripping surface that improves the gripability of the handle 14.

Along a distal end 13 of the body 12 is formed a flat, linear face 30. Linearly aligned along a linear centerline "A-A" of the face 30 are formed a plurality of equally sized receiving sockets 32. Each socket 32 is intended to be equally positioned and having a female thread, each for connection of a cleaning swab 16.

In conjunction with the body 12, a plurality of cleaning swabs 16 are provided for use in conjunction therewith as described in greater detail below. Each swab 16 is formed of a linear shaft 40, have a swab head 42 at a distal end of shaft 40 and a male threaded connection 44 at a proximal end of shaft 40. The swab head 42 is intended to be any soft gripping element, be it foam, nonwoven fabric, or even an elastomeric or pliable rubber portion. According to the presently described configuration, the male threaded connection 44 may be threadingly engaged in the receiving socket 32. Such an attachment provides a rigid, fixed but removable array of parallel cleaning swabs 16 to provide a cleaning interface for a pet grooming clippers (not shown). As should be apparent to a person having ordinary skill in the relevant art, in light of the present teachings, the threading engagement of cleaning swab shaft 40 into receiving socket 32 may be equally effectively provided through various other connections methods other than the threaded engagement as shown herein. Therefore, for purposes of the present invention, the elements contributing to a threaded connection mechanism should be defined herein to include any similarly or equivalently functioning connection mechanism within the broadest possible range of functional equivalents within the intended scope, purpose and structure.

2. Operation of the Preferred Embodiment

In operation, the clipper cleaner 10 of the preferred embodiment is prepared by placing a number of cleaning swabs 16 into the receiving sockets 32 and thereby extend from the face 30 of the body 12. The linear, parallel array of cleaning swabs 16 present the swab heads 42 as cleaning and grasping surfaces for detangling the clipper blades and combs (not shown) during or after a pet grooming application. The swab heads 42 cling to, grab and pull entangled fur from the clipper and thereby increase cleaning efficiency.

After cleaning of a pet grooming comb clips, the cleaning swabs 16 may be removed for disposal and replaced with new or otherwise prepared cleaning swabs 16.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

What is claimed is:

1. A pet grooming clipper cleaning assist device comprising: a body formed of a generally planar element having an overall thickness "T" that is appreciably smaller than an overall width "W"; along a distal end of the body forming a flat, linear face having a lateral linear centerline; a plurality of equally sized receiving sockets formed by said linear face, each said socket being equally positioned and having a female thread, each for connection of a cleaning swab; and a plurality of cleaning swabs, each of said plurality of cleaning swabs for engagement with each said socket.

2. The pet grooming clipper cleaning assist device of claim 1, wherein the dimension "W" is greater than four times the dimension "T".

3. The pet grooming clipper cleaning assist device of claim 2, wherein the dimension "W" is greater than six times the dimension "T".

4. The pet grooming clipper cleaning assist device of claim 1, wherein said generally flat, planar body further forms a grasping orifice between a main portion of the body and the handle.

5. The pet grooming clipper cleaning assist device of claim 4, wherein an inner surface of the handle further forms a series of gripping knurls adapted to provide a convenient gripping surface that improves the gripability of the handle.

6. The pet grooming clipper cleaning assist device of claim 1, wherein each said cleaning swab comprises:
a linear shaft having a swab head at a distal end of a shaft and a male threaded connection at a proximal end of said shaft.

7. The pet grooming clipper cleaning assist device of claim 6, wherein said swab head further comprises a soft gripping element.

8. The pet grooming clipper cleaning assist device of claim 7, wherein said soft griping element is selected from a group comprising: foam; nonwoven fabric; elastomeric material; and pliable rubber.

9. The pet grooming clipper cleaning assist device of claim 6, wherein said swab head further comprises a soft gripping element.

10. The pet grooming clipper cleaning assist device of claim 9, wherein said soft griping element is selected from a group comprising: foam; nonwoven fabric; elastomeric material; and pliable rubber.

11. The pet grooming clipper cleaning assist device of claim 10, wherein said cleaning swab comprises a male threaded connection and each said receiving socket comprises a female threaded connection.

12. The pet grooming clipper cleaning assist device of claim 1, wherein said cleaning swab comprises a male threaded connection and each said receiving socket comprises a female threaded connection.

\* \* \* \* \*